March 2, 1971 — H. HOETTE — 3,567,418
STRAIGHT LINE SHEAR FRAME MOUNTING MECHANISM
Filed April 29, 1968
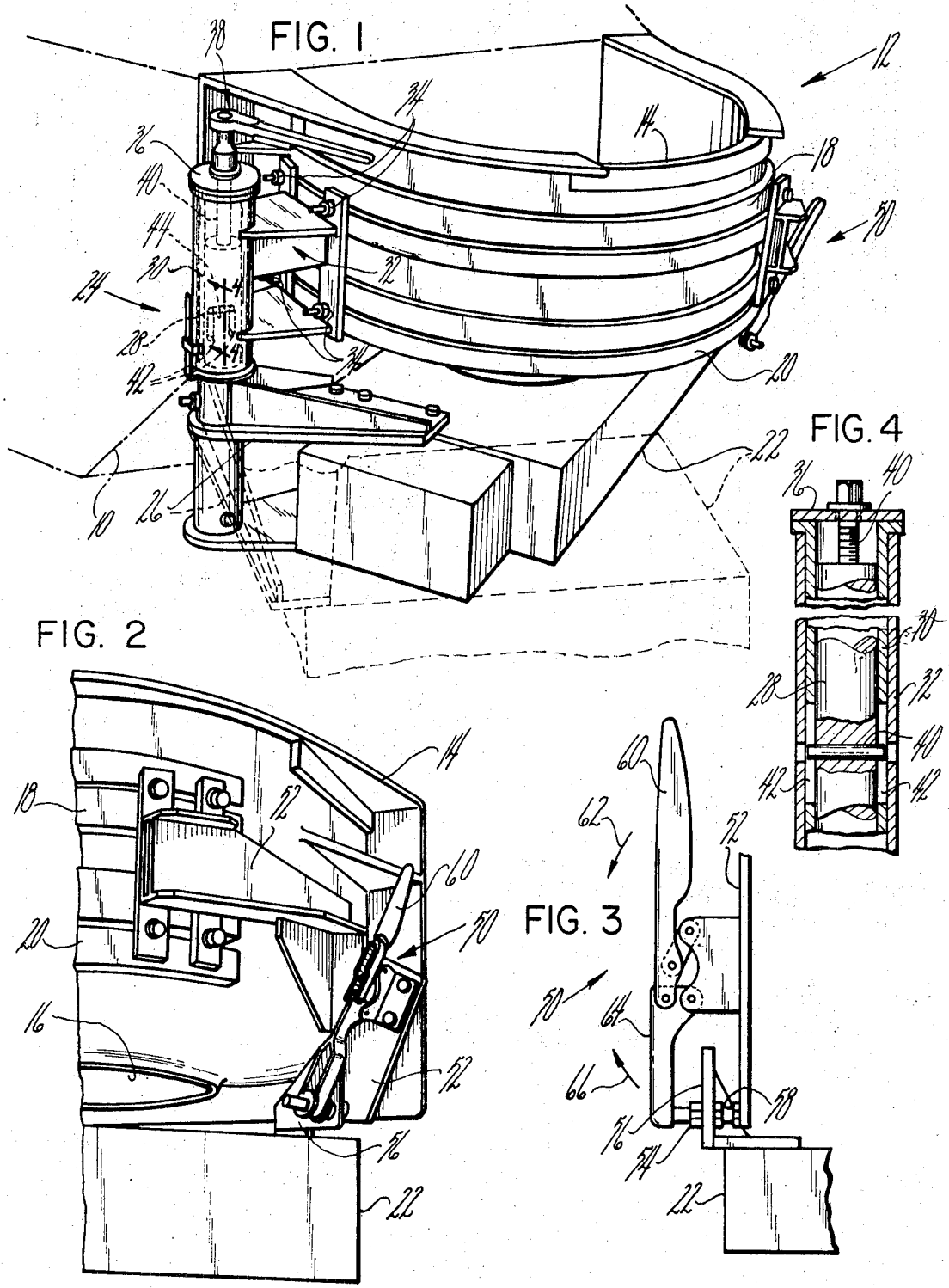
INVENTOR.
HARALD HOETTE
BY
McCormick, Paulding & Huber
ATTORNEYS United States Patent Office 3,567,418
Patented Mar. 2, 1971

3,567,418
STRAIGHT LINE SHEAR FRAME
MOUNTING MECHANISM
Harald Hoette, Farmington, Conn., assignor to
Emhart Corporation, Bloomfield, Conn.
Filed Apr. 29, 1968, Ser. No. 725,118
Int. Cl. C03b 5/26, 5/38
U.S. Cl. 65—325                              5 Claims

ABSTRACT OF THE DISCLOSURE

A rectangularly shaped frame for a plurality of straight line shears is pivotally mounted on a pivot post carried on one side of a glass feeding apparatus spout casing so that the frame is movable from and to a position beneath the outlet spout. The pivot post is rotatably supported in a bracket which is adjustably mounted on arcuately shaped gibs defined on the spout casing, and said post is vertically adjustable in this bracket. The gibs on the casing also carry a toggle clamp, which clamp is also adjustably mounted thereon to engage a clamp plate provided on a diagonally opposite corner of the shear frame from the corner associated with the pivot post.

SUMMARY OF INVENTION

This invention relates to straight line glass gob shearing devices, and deals more particularly with a novel pivot structure for swingably supporting the frame in which a plurality of straight line glass gob shearing devices are provided.

One object of the present invention is to provide a mounting mechanism for such a shear frame wherein the frame can be moved from and to an active position beneath the outlet spout of the feeder bowl.

Another object of the present invention is to provide a straight line shear frame mounting mechanism wherein the frame slidably supports a plurality of straight line glass gob shearing devices, which frame is so mounted with respect to the glass feeder bowl as to be angularly positionable in any one of a variety of angular positions with respect to the outlet thereof.

Another object of the present invention is to provide a straight line shear frame mounting mechanism of the foregoing character wherein the pivot structure is so designed that the frame can be swung in a horizontal plane from and to its active position beneath the outlet spout of the feeder bowl.

Another object of the present invention is to provide a straight line shear frame mounting mechanism of the foregoing character wherein said shear frame can be releasably clamped in its active position.

Still another object of the present invention is to provide a straight line shear frame mounting mechanism of the foregoing character wherein said shear frame is vertically adjustable with respect to the feeder bowl outlet spout.

BRIEF DESCRIPTION OF THE DRAWING

FIG. 1 is a perspective view of the glass feeding apparatus in which a glass feeder bowl would normally be provided at the end of a fore-hearth furnace or the like, and shows the frame of a straight line shear mechanism in an active position, solid lines, beneath the outlet spout of the feeder bowl, and in an inactive position, in broken lines.

FIG. 2 is a detailed view of the mechanism for clamping the rectangular straight line shear frame in its active position beneath the outlet spout of the feeder bowl.

FIG. 3 is a schematic view of the toggle clamp shown in FIG. 2.

FIG. 4 is a sectional view taken on line 4—4 of FIG. 1.

DETAILED DESCRIPTION

Turning now to the drawing in greater detail, FIG. 1 shows, in phantom lines, a downstream end 10 of a molten glass fore-hearth, with a glass feeding apparatus 12 mounted thereon in a conventional manner. The apparatus 12 includes a spout casing 14, which casing is generally semicircular as shown, and which defines an outlet spout 16 in its lower wall as best shown in FIG. 2. The spout casing 14 is generally of metal construction, comprising a portion of the frame in which the refractory material is provided for constructing the remainder of the feeder bowl (not shown). Conventionally, means is also provided for periodically forcing molten glass through outlets defined in an orifice ring (not shown) provided for this purpose in the outlet spout 16 of the casing 14 and the reader is referred to Pat. No. 2,310,290, issued to Honiss in 1943, for a more complete description of one possible means for feeding molten glass in discrete gobs, or charges through such an orifice ring.

In accordance with the present invention, the spout casing 14 also includes a pair of vertically spaced parallel gibs 18 and 20 of arcuate shape, each of which defines a generally T-shaped slot for receiving the heads of bolts 34, 34 or the like used in attaching pivot post hardware and toggle clamp hardware, to be described, to the spout casing.

Turning now to a brief description of the rectangular frame for supporting the side-by-side sets of reciprocating glass gob shearing devices indicated generally at 22 in FIG. 1, it is noted that the operation of these devices does not comprise an essential part of the present invention, but the reader is referred to a copending application to the assignee herein entitled "Shears for Molten Feeders," filed Apr. 24, 1967, in the name of Frederick J. Wythe, Ser. No. 633,257, for a more complete description of said devices. For purposes of the present disclosure, it is sufficient to note that the rectangular frame 22 does include such shearing devices, however, the significant feature of this disclosure is that the frame 22 is adapted to be moved from the position shown in solid lines FIG. 1 wherein said shears frame is located beneath the outlet spout of the feeder bowl and in inactive position indicated in broken lines wherein the frame 22 is swung away from the outlet spout 16 for removing or replacing orifice rings, and performing other maintenance.

In accordance with the present invention, a vertically disposed pivot post structure 24 is provided at one side of the feeder bowl and adjacent one corner of the rectangular frame 22, which pivot post defines a vertical axis about which the rectangular frame 22 is swung as described hereinabove. More particularly, a cantilevered pivot post bracket 26 is bolted to the rectangular frame 22 and carries an upstanding post 28, which post 28 is rotatably received in an upper cylindrical sleeve or housing 30. The cylindrical sleeve 30 comprises a part of a bracket assembly 32 which is adapted to be secured to the arcuately shaped gibs 18 and 20 by a plurality of bolts indicated generally at 34, 34. The bracket assembly 32 further includes means for restraining the pivot post 28 against axial movement in the sleeve 30, and preferably said means comprises a cap structure 36 at the upper end of the sleeve 30 together with a rotatable, reversible, ratchet device 38 which may comprise a conventional socket wrench handle, and a threaded shaft 40 having a head at its upper end for receiving the socket on the ratchet device 38. The threaded shaft 40 is thus rotatably received in the cap 36 and has a lower threaded portion which is threadably received in an upwardly open threaded bore defined in the upper end of the pivot post 28. As so constructed and arranged, rotation of the ratchet handle 38 permits the vertical position of the frame 22 to be adjusted with respect to the outlet spout casing 14 and more particularly with respect to the outlet 16 therein. Thus, the height of the glass gob shearing devices in the frame can be conveniently set.

Means is also provided for preventing alterations in this vertical adjustment when the rectangular frame 22 is swung horizontally between the active and inactive positions shown in FIG. 1. Preferably, and as indicated in FIG. 4, said means comprises a sleeve 30 rotatably mounted in the bracket assembly 32. A pair of longitudinally extending slots 42, 42 are provided in the side walls of the sleeve 30, which slots are adapted to receive the outer ends of a radially extending pin 44 carried by the pivot post 28. The ends of the slots 42, 42 when engaged by the pin 44 in response to vertical adjustments made through the ratchet device 38, also provide convenient stops for precluding disengagement between the threaded shaft 40 and the pivot post 28.

In further accordance with the present invention, means is provided for releasably retaining, or clamping the frame 22 in its active position beneath the outlet spout 16, and preferably said means comprises a toggle clamp 50 provided at a diagonally opposite corner of the rectangular frame 22 from that associated with the pivot post 28. As shown in FIG. 2 this toggle clamp 50 is mounted on a support bracket 52 carried by the gibs 18 and 20 so that the toggle clamp 50 can be mounted to the bowl-shaped casing 14 in diametrically opposed relation to the pivot post bracket 32. The arcuate gibs 18 and 20 thus allow proper orientation of the straight line shearing devices in the frame 22 with respect to a line of openings defined in the orifice ring (not shown) in the outlet spout 16.

As best shown in FIG. 3, the toggle clamp 50 comprises a lever-operated over center device for releasably retaining a movable jaw 54 against one side of a clamp plate 56 carried by the frame 22, which clamp plate 56 is itself urged against a fixed jaw 58 carried by the support bracket 52. Thus, to release the clamp 50 the lever 60 is rotated counterclockwise in the direction of the arrows 62, a depending crank arm 64 being thereby urged in a clockwise direction as indicated by the arrow 66 moving the movable clamping jaw 54 away from the plate 56 so as to permit the shears frame 22 to be pivoted from its active position shown in solid lines in FIG. 1 to its inactive position shown in broken lines in that view. Conversely, clockwise rotation clamps the frame as shown. As so constructed and arranged, the toggle clamp 50 serves to releasably retain the rectangular frame 22 in a particular vertical position dictated by the vertical adjustment made by means of the ratchet device 38 described hereinabove. That is, once the ratchet device has been used to properly position the rectangular frame 22, the toggle clamp 50 can be used to hold the frame 22 in its active position without the necessity for any vertical adjustments being made at the toggle clamp 50.

What is claimed is:
1. In a glass gob feeder bowl installation wherein several linearly reciprocable shears are mounted in a generally rectangularly shaped frame beneath the outlet spout of the feeder bowl, the improvement comprising at least one arcuately shaped gib mounted to the feeder bowl periphery, a bracket assembly carried by said gib, a vertically oriented pivot post having an upper end carried by said bracket assembly, a pivot post bracket on one corner of said rectangular frame for pivotally supporting said frame cantilever fashion from the lower end of said pivot post for movement in a horizontal plane from and to an active position beneath said outlet spout, a support bracket carried by said gib in spaced relation to said pivot post bracket assembly, a clamp plate on a corner of said frame opposite said pivoted corner and a lever operated toggle clamp carried on said support bracket for releasably clamping said plate to hold said frame in said active position.

2. The combination defined in claim 1 wherein said bracket assembly includes a sleeve mounted in fixed relation to said gib for pivotally receiving the upper end of said pivot post, and adjusting means on said sleeve and threadably received by said pivot post for retaining said post in a predetermined vertical position in said fixed sleeve during pivotal movement of said frame, the lower end of said post being fixed in said pivot post bracket on said frame.

3. The combination defined in claim 1 wherein said bracket assembly includes a sleeve mounted in fixed relation to said gib for pivotally receiving the upper end of said pivot post, and means for restraining said post against axial movement in said sleeve.

4. The combination defined in claim 3 wherein said means for so restraining said post against axial movement in said sleeve comprises a rotatable reversible ratchet device at the upper end of said sleeve, and a threaded shaft received in a threaded bore in the upper end of said pivot post for adjusting the vertical position of said frame without interfering with the pivotal movement thereof from and to said position beneath said outlet spout.

5. The combination defined in claim 4 wherein said means for so restraining said post further includes a pin carried by said pivot post and having its outer ends slidably received in slots defined in said sleeve to prevent relative rotation between said threaded shaft and said post except through operation of said reversible ratchet device.

References Cited
UNITED STATES PATENTS

| 1,512,412 | 10/1924 | Ferngren | 65—334X |
| 1,711,818 | 5/1924 | Stuckey | 65—334X |
| 1,879,690 | 9/1932 | Kadow et al. | 65—334X |
| 1,898,407 | 2/1933 | Treece | 65—334 |
| 1,994,123 | 3/1935 | Curtis, Jr. | 65—334X |
| 1,843,178 | 2/1932 | Soubiek | 65—334X |
| 2,052,578 | 9/1936 | McNamara | 65—334X |
| 2,158,708 | 5/1939 | Stuckey | 65—334X |
| 2,390,176 | 12/1943 | Ross | 65—334X |

FRANK W. MIGA, Primary Examiner

U.S. Cl. X.R.
65—332, 333, 334, 133